United States Patent [19]

James et al.

[11] Patent Number: 5,797,719

[45] Date of Patent: Aug. 25, 1998

[54] PRECISION HIGH PRESSURE CONTROL ASSEMBLY

[75] Inventors: Kenneth J. James; Brian J. Waibel, both of Newark, Del.

[73] Assignee: Supercritical Fluid Technologies, Inc., Newark, Del.

[21] Appl. No.: 739,893

[22] Filed: Oct. 30, 1996

[51] Int. Cl.⁶ .................................................. F04B 49/00
[52] U.S. Cl. ........................................ 417/46; 417/53
[58] Field of Search ............................ 417/46, 53, 44.2; 137/487.5; 210/198.2, 143

[56] References Cited

U.S. PATENT DOCUMENTS

| | | | |
|---|---|---|---|
| 3,972,654 | 8/1976 | Clayton et al. | 417/388 |
| 4,459,089 | 7/1984 | Vincent et al. | 417/383 |
| 4,681,678 | 7/1987 | Leaseburge et al. | 210/101 |
| 4,684,465 | 8/1987 | Leaseburge et al. | |
| 4,859,342 | 8/1989 | Shirasawa et al. | 210/656 |
| 5,240,603 | 8/1993 | Frank et al. | 210/198.2 |
| 5,252,041 | 10/1993 | Schumack | 417/46 |
| 5,269,930 | 12/1993 | Jameson | |
| 5,322,626 | 6/1994 | Frank et al. | 210/634 |
| 5,481,042 | 1/1996 | Burba, III et al. | 568/70 |
| 5,501,004 | 3/1996 | Onitsuka | |

Primary Examiner—Ayaz R. Sheikh
Assistant Examiner—Xuan M. Thai
Attorney, Agent, or Firm—Connolly & Hutz

[57] ABSTRACT

A precision high-pressure control assembly for supercritical fluids comprises a continuous flow system having a pressure control loop which includes a source of fluid communicating with a pump. A pressure sensor monitors the pressure of the supercritical fluid in the outlet line of the pump. A pressure controller has an input for receiving a signal relating to the pressure sent by the pressure sensor and the pressure controller yields an electronic output signal to an electropneumatic regulator. A source of air communicates with the electropneumatic regulator to provide pressurized regulated driver air directed to the pump. The electropneumatic regulator controls the regulated driver air pressure of the pump in accordance with the signal received from the pressure controller.

13 Claims, 1 Drawing Sheet

PRECISION HIGH PRESSURE CONTROL ASSEMBLY

BACKGROUND OF THE INVENTION

The present invention relates to improved assembly or system for the control of a pump to increase and closely maintain the desired pressure for a supercritical fluid.

The critical point for a substance is the temperature and pressure where the liquid and vapor phases exist in equilibrium. Above the critical point, the supercritical range, the vapor will have the high densities of a liquid but the diffusion coefficient of a vapor. The vapor looks like a "gas" but acts like a "liquid" and is called a supercritical fluid which has the superior dissolving and extracting properties of a liquid.

Supercritical fluids may function as a superior media for chemical reactions. Once a supercritical reaction is complete the fluid is vented to leave just the reaction product. Supercritical fluid reactions offer enhanced reaction rates and selectivity. Additionally, supercritical fluids technology may be used for chromagraphy and infusion as well as close pressure control or processing within the supercritical range.

Various attempts have been made to provide controls for supercritical fluids. For example, U.S. Pat. No. 4,684,465 relates to an apparatus for analyzing a process stream via supercritical fluid chromatography wherein the monitoring and control functions are related to controlling the flow rate. The '465 patent is an auto sampler which uses only one pump cycle and thus does not involve a continuous flow.

SUMMARY OF THE INVENTION

An object of this invention is to provide a system or assembly for sensing the desired supercritical fluid substance pressure and closely control the process pump to maintain the desired pressure thus providing enhanced properties for a specific application.

An assembly for the successful application of this technology is the accurate sensing of pressure, which feeds a signal to a process controller with an electric signal output. The output electrical signal from the process controller provides the input signal to an electropneumatic regulator which is used to control the drive pressure to a positive displacement pump, for example a 100:1 diaphragm pump. For the $CO_2$ system, the process input to the pump is liquid $CO_2$ at 800–1,000 psi, and output pressure from the pump may be up to approximately 10,000 psi.

The unique assembly and programming of the downstream pump discharge pressure sensor, process controller, electronic signal controller output, and electropneumatic pressure regulator control valve have enhanced the useful application of supercritical fluid technology.

THE DRAWINGS

FIG. 1 is a schematic representation of a preferred embodiment of the invention; and FIG. 2 is a graph comparing the invention and prior art ramp/dwell characteristics.

DETAILED DESCRIPTION

Figure 1:
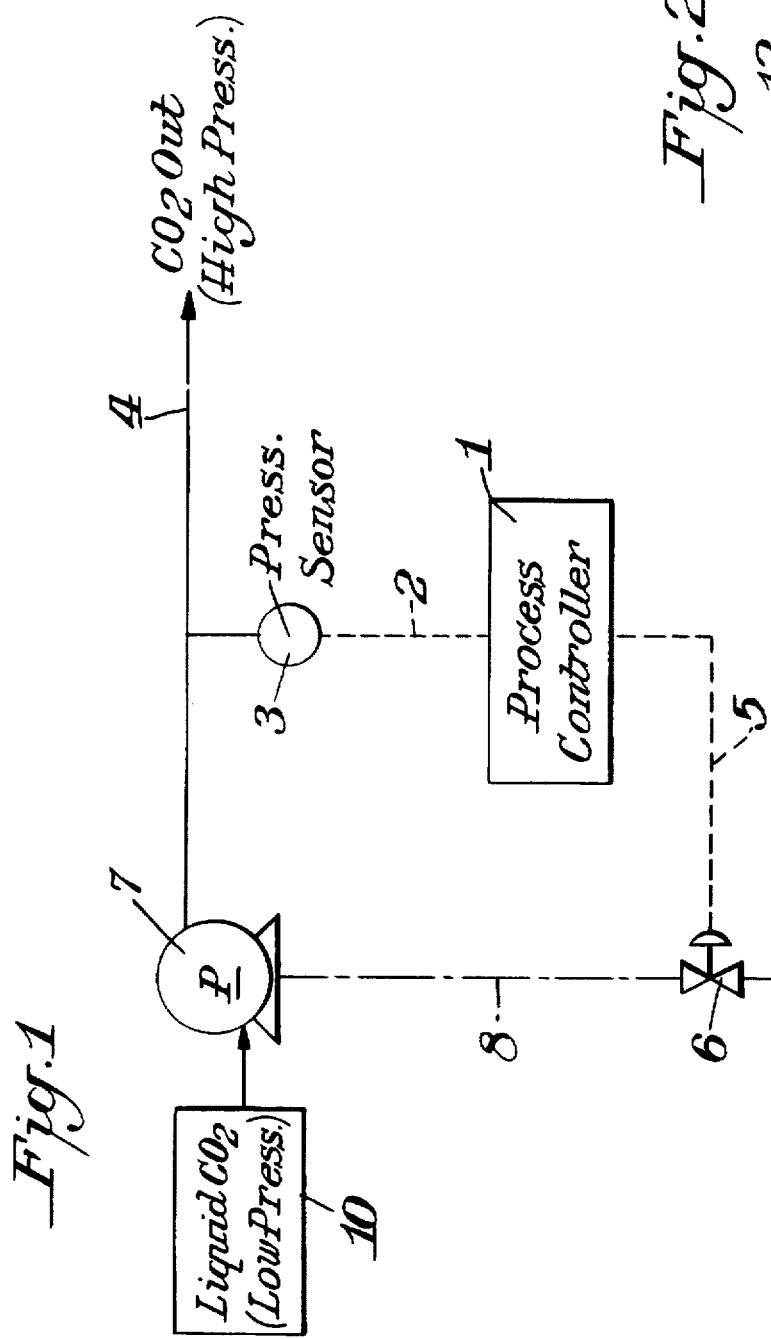

FIG. 1 illustrates a preferred embodiment of this invention. As shown therein, the assembly of this invention is utilized for the handling of $CO_2$. A source 10 of liquid $CO_2$ would be provided with the liquid $CO_2$ at low pressure of about 800–1,000 psi. The $CO_2$ would be fed to a pump 7 and discharged from the pump through outlet line 4.

Pump 7 functions to compress the $CO_2$ whereby the high pressure creates a supercritical fluid. Pump 7 may be of any suitable construction, as later described, and preferably is a diaphragm driven piston pump of 100:1 ratio.

The pressure of the $CO_2$ in outlet line 4 is sensed by a suitable pressure sensor 3 which accurately monitors the desired high pressure (critical fluid) of the $CO_2$.

Pressure sensor 3 provides an input signal 2 to process controller 1. Process controller 1, in turn, yields a control output signal 5 to an electropneumatic regulator 6. Regulator 6 controls the diaphragm pump 7 to compress the $CO_2$ fed from reservoir 10. Thus, the pump 7 transfers the $CO_2$ from the reservoir 10 and elevates and maintains the desired supercritical fluid pressure. In this manner, liquid $CO_2$ in reservoir 10 is fed under low pressure such as about 800–1,000 psi to pump 10 and is discharged in outlet line 4 under high pressure of, for example, 800–20,000 psi.

In operation, air such as house air at a pressure of about 100 psi is fed from a conventional compressor 9 and is closely controlled to become the regulated driver air 8 at pressures ranging from 0 to full 100 psi pressure and then to the pump 7. The high pressure in outlet line 4 is monitored by pressure sensor 3 to rapidly and continuously provide the input 2 to process controller 1. The control outlet signal 5 from process controller 1 sends an electronic signal back to the electropneumatic regulator 6 and the cycle is repeated. The cycle operates in a continuous manner and permits precise adjustments of the pressure resulting in outlet line 4.

Figure 2:
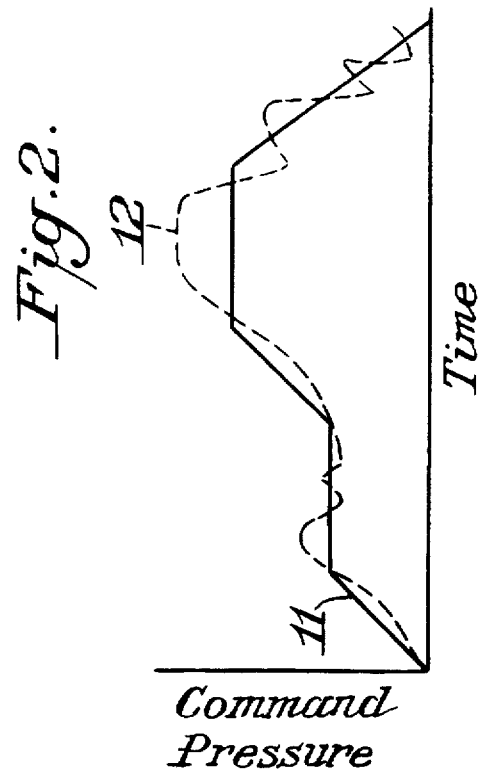

An advantageous use of the invention would be to accurately program various pressure ramps and dwells within a tolerance of ±1 psi. FIG. 2, for example, compares the accuracy in achieving ramps/dwells characteristics with use of the invention as contrasted to conventional prior art techniques. As shown in FIG. 2 the command pressure is plotted against time. The curve 11 shown in solid represents a ramp/dwell curve by practice of the invention where there could be precise pressure control. Thus, as shown in FIG. 2 a ramp of uniform slope would be achieved over a set period of time until a dwell or plateau is reached which is then held precisely at the desired pressure for the next period of time. After the dwell period of time another uniform ramp would be achieved resulting in a precise dwell, etc. In contrast, curve 12 reflects prior art characteristics of attempting to achieve ramps and dwells where there is not the precise control of pressure as with the present invention. As shown therein by the curve 12 both the ramps and dwells are irregular.

Very close pressure control is thus the key to effectively achieving precise pressure-temperature ramping to effect solvent properties of a supercritical fluid for selective extraction of target compounds from a complex mixture. Accordingly, this technique provides a very cost effective and environmentally friendly alternative rather than the more traditional solvent extraction techniques for separation of mixtures.

By close control of pressure different components of a mixture may be solvated using either static extraction or dynamic extraction or a combination. By understanding the phase diagrams of the mixtures, pressure and temperature of the supercritical fluid may be controlled to select and analyze material of interest to be removed.

In general, lower temperatures and higher pressures are desired to avoid functionalizing, denaturing, or thermal transition.

It is to be understood that although the invention has been described with respect to the handling of carbon dioxide, the invention may also be used for other substances, including but not limited to propane, ethane, pentane, isobutane, ammonia, nitrogen, and various other fluorocarbons.

The following table lists the critical conditions for various solvents with which the invention could be practiced.

| Solvents | Critical Temperature (°C.) | Critical Pressure (bar) |
|---|---|---|
| Carbon dioxide | 31.1 | 73.8 |
| Ethane | 32.2 | 48.8 |
| Ethylene | 9.3 | 50.4 |
| Propane | 96.7 | 42.5 |
| Propylene | 91.9 | 46.2 |
| Cyclohexane | 280.3 | 40.7 |
| Isopropanol | 235.2 | 47.6 |
| Benzene | 289.0 | 48.9 |
| Toluene | 318.6 | 41.1 |
| p-Xylene | 343.1 | 35.2 |
| Chlorotrifluoromethane | 28.9 | 39.2 |
| Trichlorofluoromethane | 198.1 | 44.1 |
| Ammonia | 132.5 | 112.8 |
| Water | 374.2 | 220.5 |

The invention overcomes limitations of the prior art by offering a 200-fold improvement in the control of pressure in the 800 to 20,000 psi range. The control systems offered by the prior art would frequently result in pump output pressure several hundred psi higher than the target pressure, thus yielding the application of the technology to be either inefficient or inapplicable.

The use of the invention permits higher flow rates to the order, for example, of 19 liters per minute in contrast to the prior art flow rates which are only micro liters per minute. Accordingly, the practice of the invention permits flow rates having several orders of magnitude greater than with the prior art. A range of flow rate possible with the present invention is 0.0001–19 liters per minute.

The invention may be used in various processes. Reference is made to U.S. Pat. No. 5,269,930, the details of which are incorporated herein by reference thereto, which relates to collecting analyte in a supercritical fluid extraction process. The invention may be used, for example, in such a process.

As previously pointed out the invention permits the precise monitoring and control of pressure in the continuous system. A typical control range for the pressure in outlet 4 by use of the invention is 800–20,000 psi with the preferred range being 1,000 to 10,000 psi.

Any suitable equipment may be used for the components in the practice of this invention. For example, microprocessor 1 may be a PLC direct, DL405 series PLC comprised of a DL-440 CPU (no. D4-440), a 4-Channel Analog Input Module (D4-04AD) and a 2-Channel Analog Output Manual (D4-02AD). The pressure sensor 3 may be a Pressure Transducer which could be a Setra pressure transducer, part no. 280111-10 psig. The pressure controller could be an air valve/volume booster which is a Proportion—Air, part no. QB1TFIE100/PSR-2. The pump 7 could be a liquid/gas booster LBGP such as a Haskel Air-Driven Liquid Pump, part no. 29376-ASF-100-D1. Suitable components such as described in U.S. Pat. No. 4,684,465 (the details of which are incorporated herein) may also be used as part of the assembly or system of this invention.

What is claimed is:

1. A precision high-pressure control assembly for supercritical fluids comprising a continuous flow system having a pressure control loop which includes a source of fluid, said source of fluid communicating with a pump for compressing the fluid and increasing the pressure of the fluid to create a supercritical fluid, an outlet line leading from said pump, a pressure sensor monitoring the pressure of the supercritical fluid in said outlet line, a process controller having an input for receiving a signal relating to the pressure sensed by said pressure sensor, said process controller yielding an electronic control output signal to an electropneumatic regulator, a source of air communicating with said electropneumatic regulator to provide pressurized regulated driver air directed to said pump, and said electropneumatic regulator controlling the regulated driver air pressure of said pump in accordance with the signal received from said process controller.

2. The assembly of claim 1 wherein said pump is a positive displacement diaphragm pump.

3. The system of claim 1 wherein said fluid is carbon dioxide.

4. The system of claim 1 wherein said fluid is selected from the group consisting of propane, ethane, pentane, isobutane, ammonia, nitrogen and fluorocarbons.

5. A method for close pressure control of a supercritical fluid comprising feeding a fluid under low pressure to a pump, increasing the pressure of the fluid by the pump wherein the fluid is discharged to an outlet line as a supercritical fluid under high pressure, sensing the pressure of the supercritical fluid in the outlet line by a pressure sensor which provides an input signal to a process controller with the input signal being reflective of the amount of pressure being sensed, sending an electronic control output signal from the process controller to an electropneumatic pressure regulator, supplying air from an air source to the electropneumatic pressure regulator to provide pressurized regulated driver air directed to the pump, and controlling the regulated driver air pressure of the pump by the electropneumatic pressure regulator in accordance with the signal received by the electropneumatic pressure regulator from the process controller.

6. The method of claim 5 wherein the fluid is carbon dioxide.

7. A method for close pressure control of a supercritical fluid comprising feeding a fluid under low pressure to a pump, increasing the pressure of the fluid by the pump wherein the fluid is discharged to an outlet line as a supercritical fluid under high pressure, sensing the pressure of the supercritical fluid in the outlet line by a pressure sensor which provides an input signal to a process controller with the input signal being reflective of the amount of pressure being sensed, sending an electronic control output signal from the process controller to a pressure regulator, controlling the drive pressure of the pump by the pressure regulator in accordance with the signal received by the pressure regulator from the process controller, and wherein the fluid is selected from the group consisting of propane, ethane, pentane, isobutane, ammonia, nitrogen and fluorocarbons.

8. A method for close pressure control of a supercritical fluid comprising feeding a fluid under low pressure to a pump, increasing the pressure of the fluid by the pump wherein the fluid is discharged to an outlet line as a supercritical fluid under high pressure, sensing the pressure of the supercritical fluid in the outlet line by a pressure sensor which provides an input signal to a process controller with the input signal being reflective of the amount of pressure being sensed, sending an electronic control output signal from the process controller to a pressure regulator, controlling the drive pressure of the pump by the pressure regulator in accordance with the signal received by the pressure regulator from the process controller, and wherein the pressure in the outlet line is in the range of 800–200,000 psi.

9. A method for close pressure control of a supercritical fluid comprising feeding a fluid under low pressure to a pump, increasing the pressure of the fluid by the pump wherein the fluid is discharged to an outlet line as a supercritical fluid under high pressure, sensing the pressure of the supercritical fluid in the outlet line by a pressure sensor which provides an input signal to a process controller with the input signal being reflective of the amount of pressure being sensed, sending an electronic control output signal from the process controller to a pressure regulator, controlling the drive pressure of the pump by the pressure regulator in accordance with the signal received by the pressure regulator from the process controller, and wherein the pressure is controlled to accurate obtain at least one ramp and one dwell of high precision.

10. The method of claim 9 wherein a plurality of ramps and dwells are obtained.

11. The method of claim 9 wherein the pressure is controlled to an accuracy of ±1 psi.

12. The method of claim 10 wherein the method is used as pressure-temperature ramping to effect solvent properties of the supercritical fluid for selective extraction of target compounds.

13. A method for close pressure control of a supercritical fluid comprising feeding a fluid under low pressure to a pump, increasing the pressure of the fluid by the pump wherein the fluid is discharged to an outlet line as a supercritical fluid under high pressure, sensing the pressure of the supercritical fluid in the outlet line by a pressure sensor which provides an input signal to a process controller with the input signal being reflective of the amount of pressure being sensed, sending an electronic control output signal from the process controller to a pressure regulator, controlling the drive pressure of the pump by the pressure regulator in accordance with the signal received by the pressure regulator from the process controller, and wherein the fluid flows from the pump at a flow rate of from 0.0001 to 19.0 liters per minute.

* * * * *

UNITED STATES PATENT AND TRADEMARK OFFICE
CERTIFICATE OF CORRECTION

PATENT NO. : 5,797,719
DATED : August 25, 1998
INVENTOR(S) : Kenneth J. James, et al.

It is certified that error appears in the above-identified patent and that said Letters Patent is hereby corrected as shown below:

On the cover page of the patent item [19] should be "Waibel et al.";

On the cover page of the patent item [75] should be "Brian J. Waibel; Kenneth J. James, both of Newark, Del.".

Signed and Sealed this

Sixteenth Day of March, 1999

Attest:

Q. TODD DICKINSON

Attesting Officer

Acting Commissioner of Patents and Trademarks